Feb. 27, 1934.   J. C. HEINTZ   1,949,275
BELT VULCANIZING APPARATUS
Filed May 13, 1932    4 Sheets-Sheet 1

Inventor
James C. Heintz
By Hull, Brock & West
Attorney

Feb. 27, 1934. J. C. HEINTZ 1,949,275
BELT VULCANIZING APPARATUS
Filed May 13, 1932 4 Sheets-Sheet 2

Inventor
James C. Heintz
By Hull, Brock West
Attorney

Feb. 27, 1934.  J. C. HEINTZ  1,949,275
BELT VULCANIZING APPARATUS
Filed May 13, 1932  4 Sheets-Sheet 3
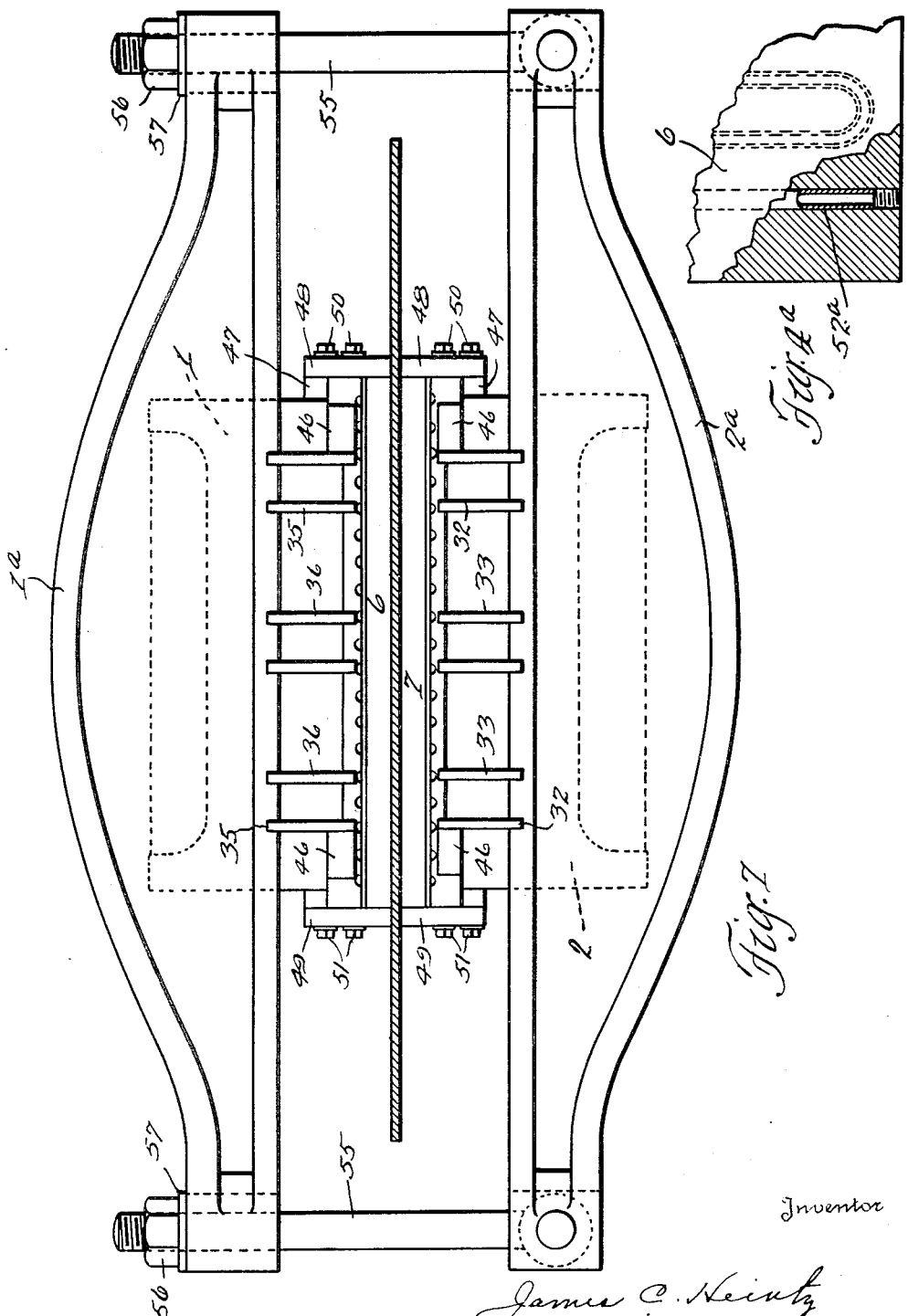

Patented Feb. 27, 1934

1,949,275

UNITED STATES PATENT OFFICE 1,949,275

BELT VULCANIZING APPARATUS

James C. Heintz, Lakewood, Ohio

Application May 13, 1932. Serial No. 611,174

4 Claims. (Cl. 18—17)

This invention relates to a vulcanizing apparatus for repairing or splicing rubber belts.

The main object of the invention is to provide a simple and compact apparatus of the character described which is particularly adapted for repairing or splicing a rubber belt and which may be quickly and readily secured to or removed from the belt.

Another object of the invention is to provide a vulcanizing apparatus of the character described which is provided with cooling coils by means of which the platens may be cooled rapidly so as to permit the apparatus to be removed from the belt within a short time after the curing operation has been completed.

Another object of the invention is to provide an apparatus of the character described which is well insulated and in which the temperature is automatically controlled or regulated so that the apparatus may be operated at any desired temperature and at a low cost.

Figure 1:
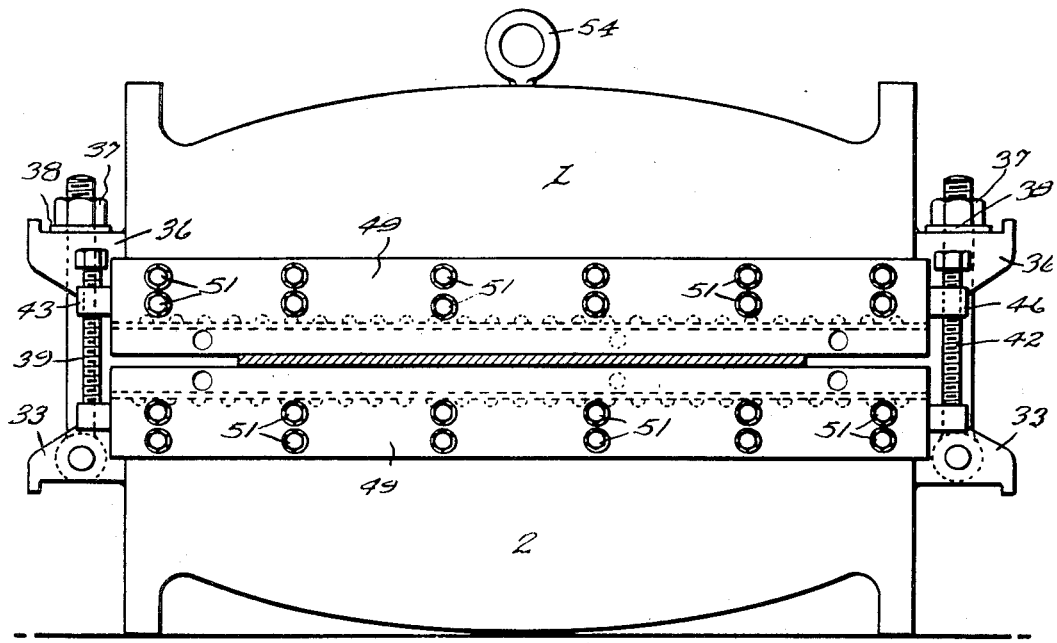
Figure 2:
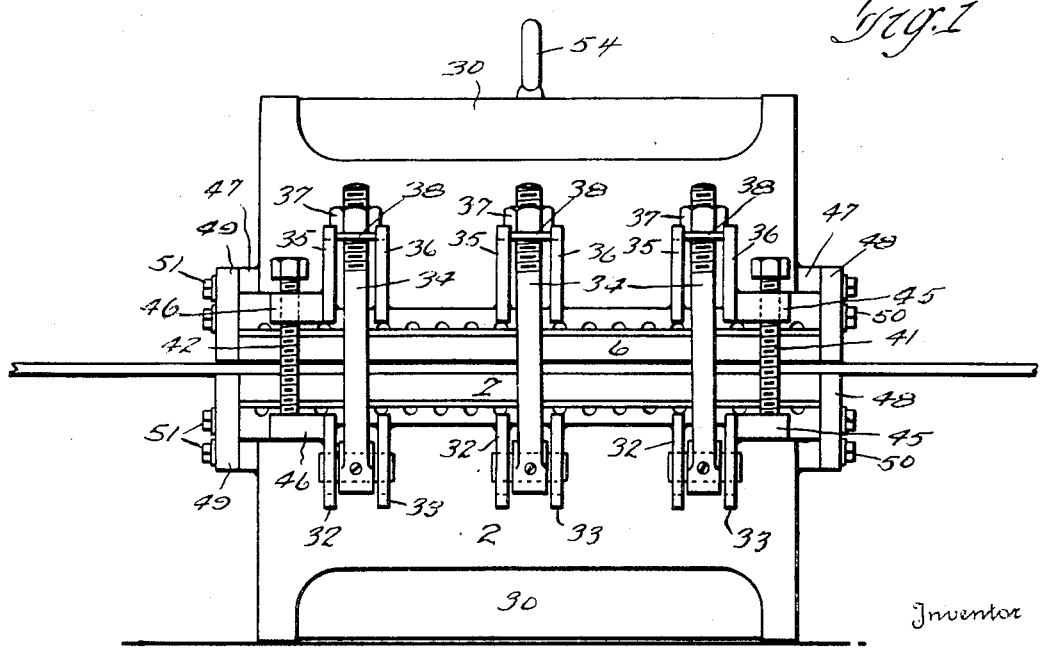
Figure 3:
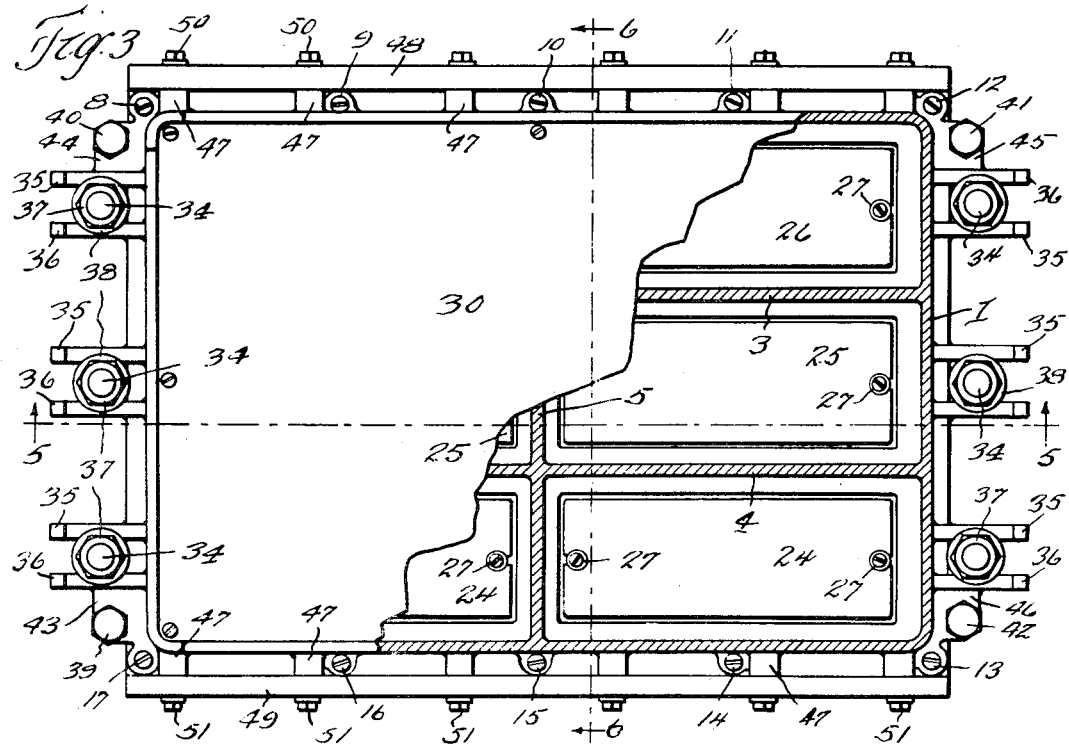
Figure 4:
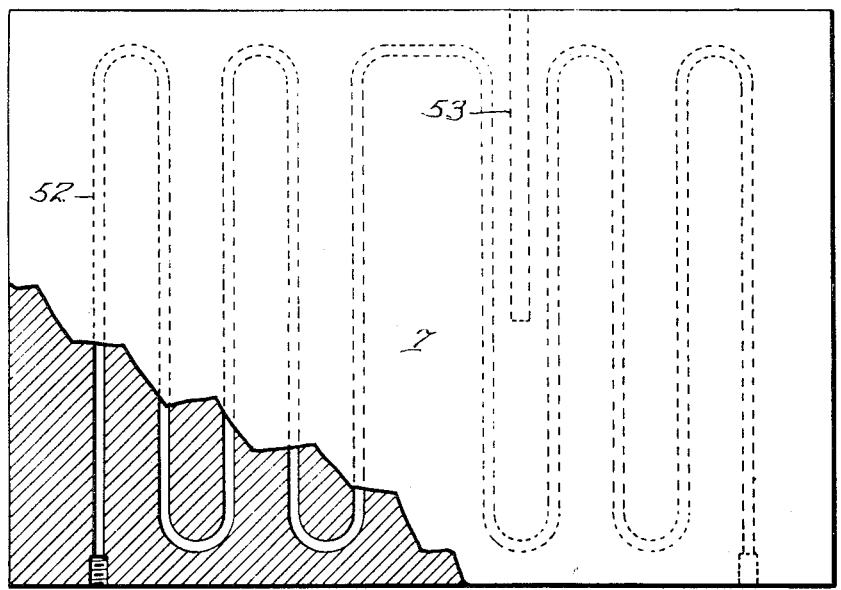
Figure 5:
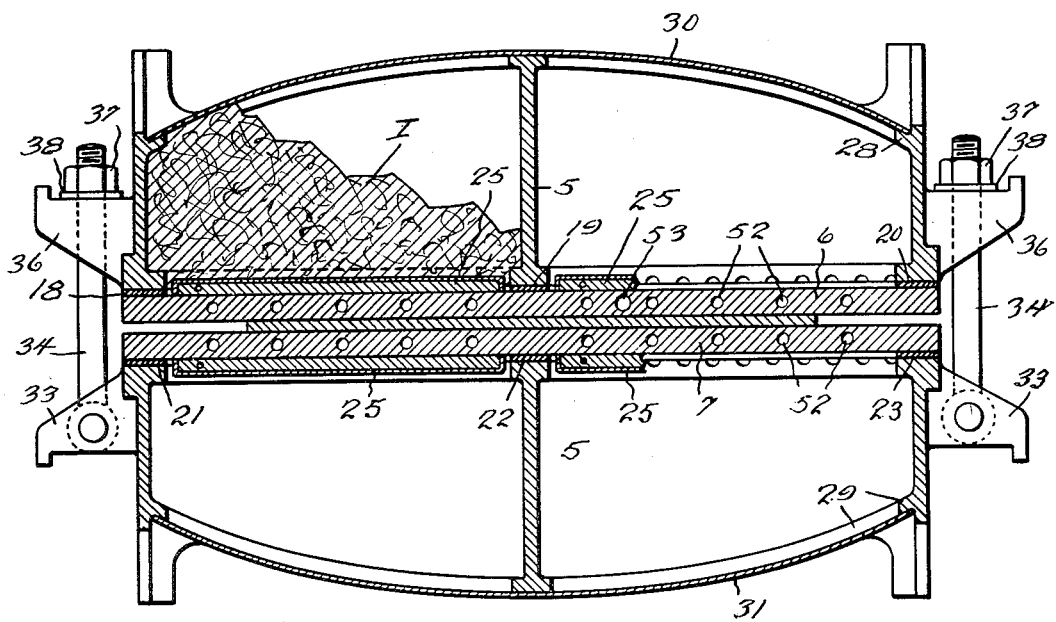
Figure 6:
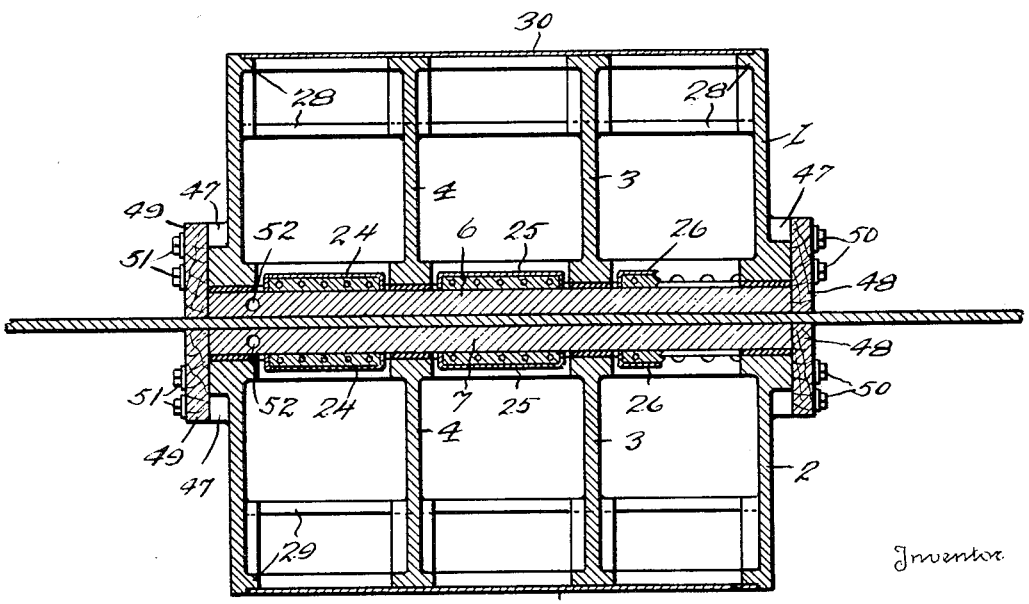

Further and more limited objects of the invention will appear as the description proceeds and by reference to the accompanying drawings in which Fig. 1 is a view in side elevation disclosing my improved apparatus applied to a belt; Fig. 2 is a view similar to Fig. 1 but taken at right angles thereto; Fig. 3 is a top plan view of the apparatus with the top plate broken away to disclose the heating elements; Fig. 4 is a view partly in section and partly in plan of one of the platens; Fig. 4ª is a fragmentary sectional view of a modified form of platen; Fig. 5 is a vertical sectional view on the line 5—5 of Fig. 3; Fig. 6 is a vertical sectional view on the line 6—6 of Fig. 3; and Fig. 7 is a view in side elevation of a slightly modified form of the apparatus.

Referring now to the drawings, the apparatus consists of a pair of frames 1 and 2, preferably formed of heavy cast steel. The frames are substantially identical and each is rectangular in shape and provided with an outer peripheral wall having longitudinally extending webs 3 and 4 and a laterally extending cross web 5. Secured to the bottom of each of the frames 1 and 2 are a pair of platens 6 and 7 which are preferably formed of cast aluminum and which are held in place by suitable screws or bolts 8, 9, 10, 11, 12, 13, 14, 15, 16 and 17. The platens 6 and 7 are insulated from the frames by suitable insulating gaskets which include portions 18, 19, 20, 21, 22 and 23 which are disposed about the periphery of the frames and beneath the ribs 3, 4 and 5. The bottom surfaces of the ribs 3, 4 and 5 are also corrugated or grooved so as to reduce the conduction of heat away from the platens. Secured to each of the platens are a plurality of electrical heating elements 24, 25 and 26 which are held in place by suitable screws 27. The electrical heating elements are of well known construction and are disposed in intimate contact with the platens and are preferably enclosed within a metal sheath.

The frames 1 and 2 are each provided with inwardly directed peripheral flanges 28 and 29 to which are secured cover plates 30 and 31. The spaces between the cover plates and the platens are filled with asbestos or other suitable heat insulating material I, as shown in Fig. 5, the insulating material being omitted from the other views for the sake of clearness. The lower frame is provided with a plurality of pairs of spaced lugs 32 and 33 to which are pivotally secured bolts 34. Carried by the upper frame member 1 are a plurality of pairs of spaced lugs 35 and 36 which are disposed opposite the bolts 34 and adapted to receive the same therebetween. Secured over the bolts 34 are nuts 37 and washers 38 by means of which suitable pressure is applied to the two frame members. Also carried by the upper frame members are a plurality of screws or bolts 39, 40, 41 and 42 which are adapted to engage suitable projections 43, 44, 45 and 46 formed on the lower frame member 2 the purpose of which will hereinafter appear. The opposite sides of each of the frame members 1 and 2 are provided with outwardly extending bosses or projections 47 to which are secured wooden blocks 48 and 49 which are held in place by suitable bolts 50 and 51 the purpose of which will also hereinafter appear.

Each of the plates 6 and 7 is preferably formed of cast aluminum and each platen is provided with a tortuous bore or passageway 52 the outer ends of which are adapted to be connected with a suitable source of water supply whereby water may be delivered through the platen for cooling the same. The most practical way of forming this tortuous passageway is to cast within the platen a suitable pipe or conduit 52ª, the ends of which are adapted to receive a suitable connection for delivering water therethrough. Each of the platens is also provided with a bore 53 which is adapted to receive therein a suitable thermometer which is connected in the electrical circuit in such a manner as to control the temperature of the platens. This circuit and the control therefor form no part of this invention but it is to be understood that the apparatus is provided with suitable controls for maintaining the temperature of the platens substantially constant.

In the use of the apparatus the upper and lower frames are placed upon opposite sides of the belt to be spliced or repaired and the bolts 34 moved to the positions shown in Figs. 1 and 2. The nuts 37 are then tightened until a suitable pressure is applied to the belt. The upper frame member 1 is provided with a suitable eye-bolt 54 by means of which the same may be lifted as desired. The current is then turned on and the automatic control device is then set so as to maintain the temperature of the platens at approximately 286° F. and to cut out at approximately 287° F. However, this temperature may be regulated as desired within a range of from 220° F. to 315° F. Each platen is supported by the heavy cast steel frame which, in cooperation with the clamping bolts 34 at the sides of the vulcanizer, serves to clamp the two halves of the vulcanizer together so as to apply a pressure of about 100 pounds per square inch over the entire surface of the belt. The wooden blocks 48 and 49 serve to taper off or to reduce the heat at the edges of the platens so that the belt will not be marked. In the ordinary use of the apparatus, the current is first turned on and the vulcanizer is heated to a vulcanizing temperature. This operation requires between 25 and 50 minutes, depending upon the size of the apparatus. After the vulcanizer is heated, the current is automatically controlled by the automatic control means hereinbefore referred to. After the vulcanizer is heated, the current is off from two-thirds to three-fourths of the time inasmuch as the control will turn on the current only when there is a loss of heat through radiation or conduction. The curing or vulcanizing operation requires between 25 and 35 minutes depending upon the size of the belt being repaired. When the apparatus is used for splicing belts, the belt is first skived or cut down in accordance with standard belt practice and then the ends cemented and placed one over the other. The ends which are to be spliced are then inserted between the two platens and the apparatus set in operation, as hereinbefore described. With large size conveyor belts it is sometimes necessary to employ two or more heating operations to complete the splice. When a plurality of curing operations are necessary, the platens are separated by screwing the screws 39, 40, 41 and 42 inwardly against the projections 43, 44, 45 and 46 to force the platens apart. The apparatus or the belt may then be shifted for a second curing operation. When the apparatus is to be used to repair snags or defective portions of the belt, the operation is the same except that the skiving operation is usually not necessary.

In view of the fact that the platens are well insulated from the frame and are covered by a thick layer of asbestos or other suitable heat insulating material, the heat loss through radiation or conduction is very small. In repairing or splicing belts which have been exposed to the weather, the belts frequently contain considerable moisture. If, after the curing operation, the platens are immediately removed, the moisture in the belt having been converted into steam will burst or rip the belt. It is therefore necessary to cool the apparatus down to normal temperature before removing the platens. If the apparatus were allowed to cool by radiation, it would require from one to three hours to cool. However, if a suitable source of water supply is connected with the pipe 52ª and cold water delivered therethrough, the apparatus can be cooled down to normal temperature within ten or fifteen minutes. The platens may then be removed from the belt without any danger of explosion or ripping of the belt.

In Fig. 7 I have disclosed a slightly modified form of apparatus which is identical with that disclosed in Figs. 1 to 6 inclusive except that the apparatus is provided with a pair of large upper and lower frame members 1ª and 2ª which fit over the lugs 32, 33 and 35, 36 and which are especially adapted for repairing large size conveyor belts. In this form of apparatus I provide bolts 55 which are pivotally secured to the lower frame member 2ª and engage in bifurcated portions provided in the upper frame member 1ª. Suitable nuts 56 and washers 57 are provided by means of which pressure is applied to the platens. The bolts 55 are spaced apart a sufficient distance to receive therebetween a wide conveyor belt.

It will now be clear that I have provided a belt vulcanizing and repair apparatus which will accomplish the objects of the invention as hereinbefore stated. Various changes may be made in the details of construction as well as in the size and arrangement of parts without departing from the spirit of my invention. It will be understood that the embodiments of the invention herein disclosed are merely illustrative and are not to be considered in a limiting sense as the invention is limited only in accordance with the scope of the appended claims.

Having thus described my invention, what I claim is:

1. A belt vulcanizing apparatus comprising upper and lower frame members, upper and lower platens secured to said frame members respectively electrical heating elements for heating said platens, a cover for each of said frame members, heat insulating material disposed between said covers and platens, the surface of said frame contiguous to said platens being grooved to reduce heat loss by conduction through said frame.

2. A belt vulcanizing apparatus comprising upper and lower frame members, upper and lower platens secured to said frame members respectively, electrical heating elements for heating said platens, a cover for each of said frame members, heat insulating material disposed between said covers and platens, the surface of said frame contiguous to said platens being grooved to reduce heat loss by conduction through said frame, and means for delivering a cooling fluid through said platens.

3. A belt vulcanizing apparatus comprising upper and lower frame members, upper and lower platens secured to said frame members respectively, electrical heating elements for heating said platens, a cover for each of said frame members, heat insulating material disposed between said covers and platens, the surface of said frame contiguous to said platens being grooved to reduce heat loss by conduction through said frame, and means for delivering a cooling fluid through said platens, said means including conduits embedded in said platens.

4. A belt vulcanizing apparatus comprising upper and lower frame members, upper and lower platens secured to said frame members respectively, electrical heating elements for heating said platens, a cover for each of said frame members, heat insulating material disposed between said covers and said platens, means enabling air to circulate between the frame members and platens whereby to reduce heat loss by conduction through the frame members, and means for delivering a cooling fluid through said platens.

JAMES C. HEINTZ.